United States Patent [19]

Maci

[11] 4,007,819
[45] Feb. 15, 1977

[54] FAN DRIVE FLUID CIRCULATION APPARATUS

[75] Inventor: Raymond James Maci, Indianapolis, Ind.

[73] Assignee: Wallace Murray Corporation, New York, N.Y.

[22] Filed: June 20, 1975

[21] Appl. No.: 588,692

[52] U.S. Cl. .................... 192/58 B; 192/82 T; 192/113 B
[51] Int. Cl.² ............... F16D 35/00; F16D 43/25
[58] Field of Search ............ 192/58 B, 82 T, 113 B

[56] References Cited
UNITED STATES PATENTS

| | | | |
|---|---|---|---|
| 3,179,221 | 4/1965 | Weir | 192/58 B |
| 3,841,451 | 10/1974 | Saylor et al. | 192/58 B |
| 3,907,084 | 9/1975 | Hall | 192/58 B |

*Primary Examiner*—Allan D. Herrmann
*Attorney, Agent, or Firm*—Thomas J. Greer, Jr.

[57] ABSTRACT

A shear liquid fan drive assembly for radiator cooling system of an internal combustion engine of the type wherein a temperature responsive valve controls the degree of rotary coupling between the engine and a radiator cooling fan by controlling the quantity of shear liquid between a driving disc and a driven housing carrying the fan. The specific improvement relates to a modification for redirecting flow of shear liquid to inhibit breakdown of the shear liquid due to overheating.

5 Claims, 6 Drawing Figures

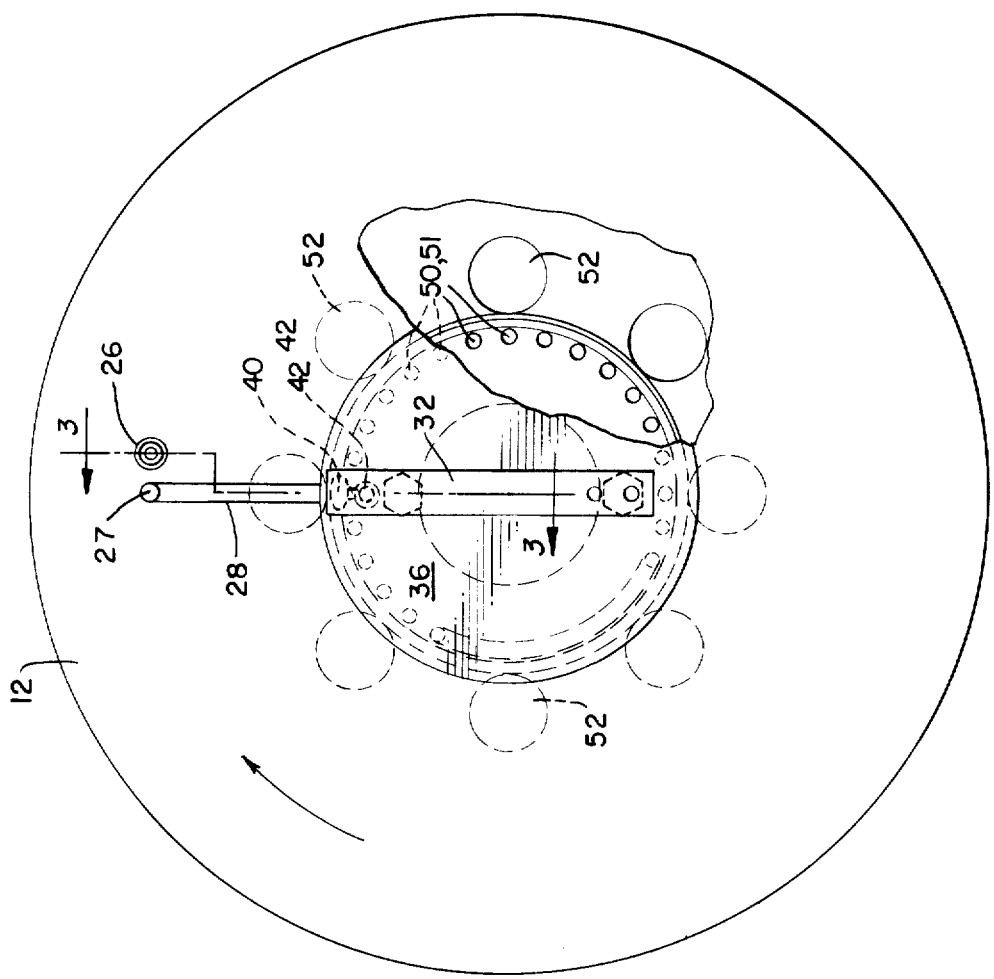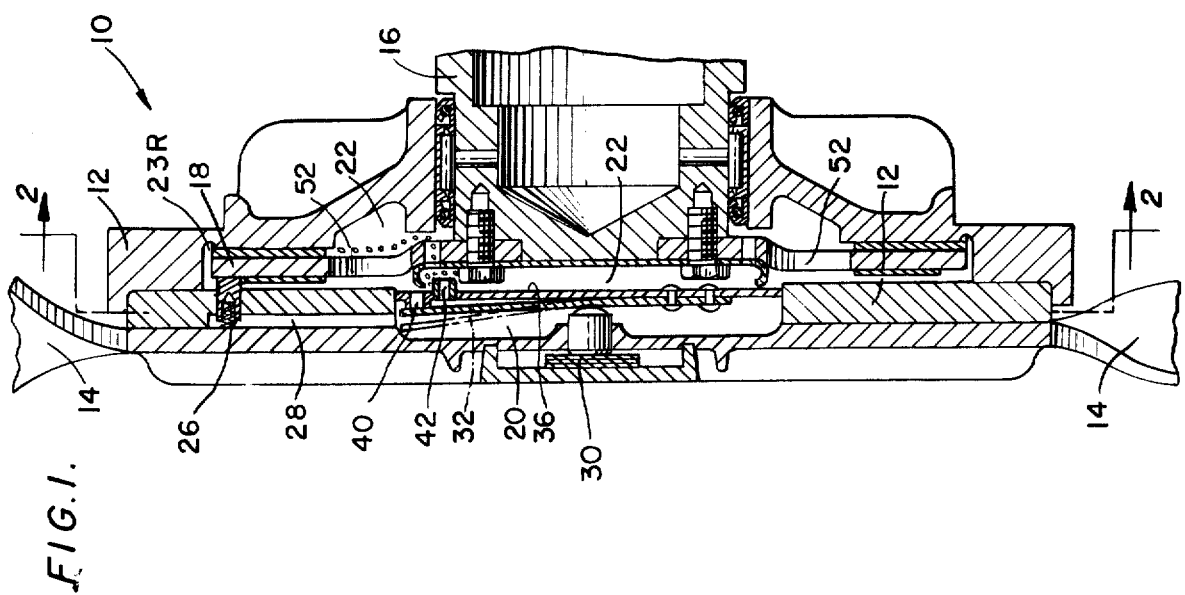

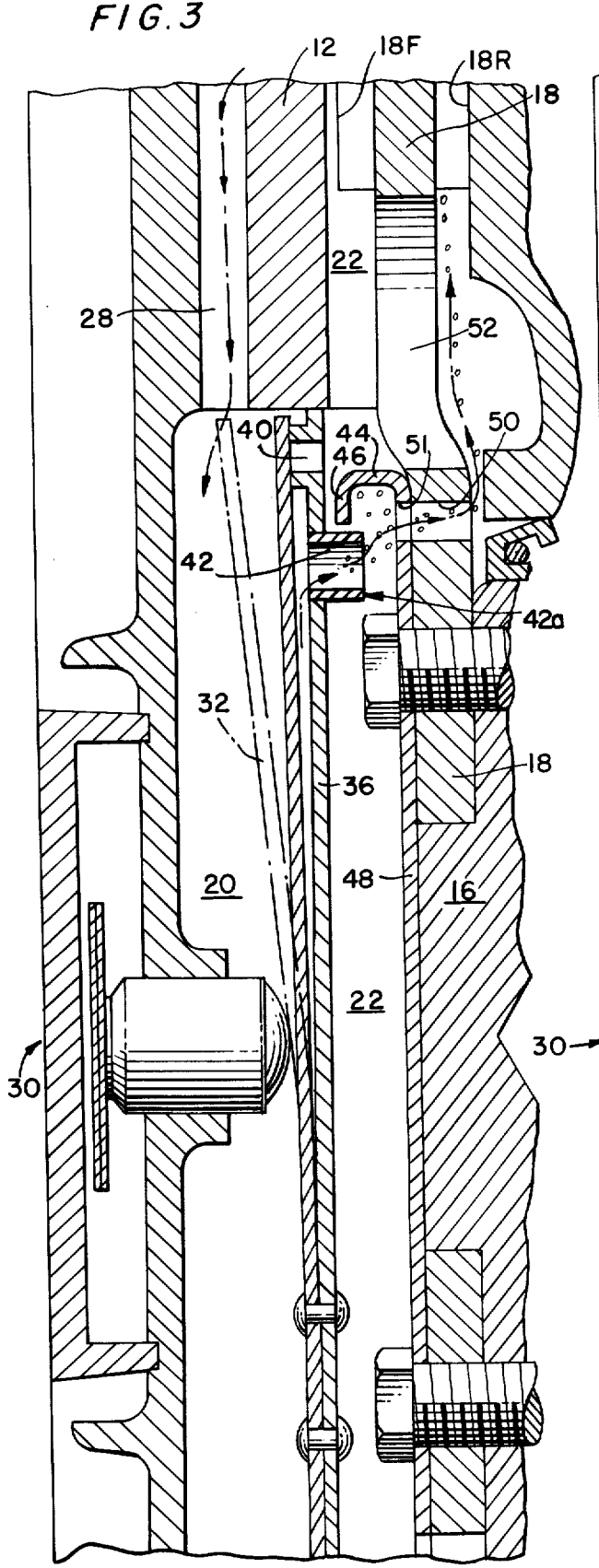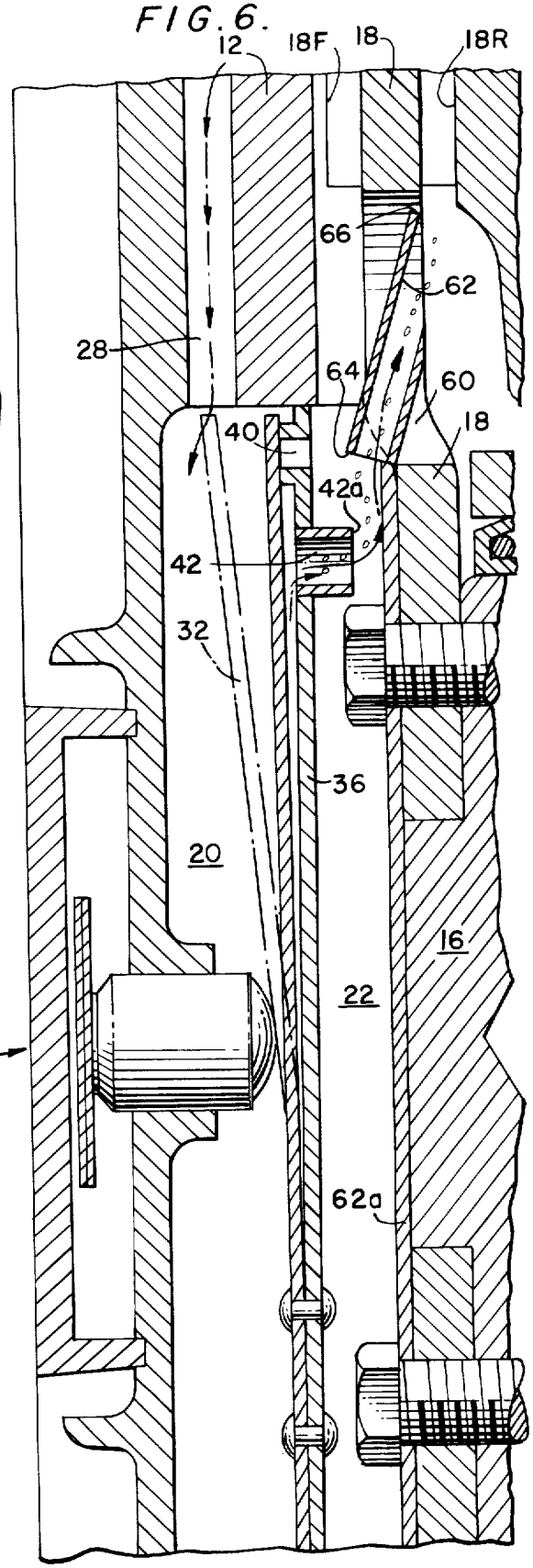

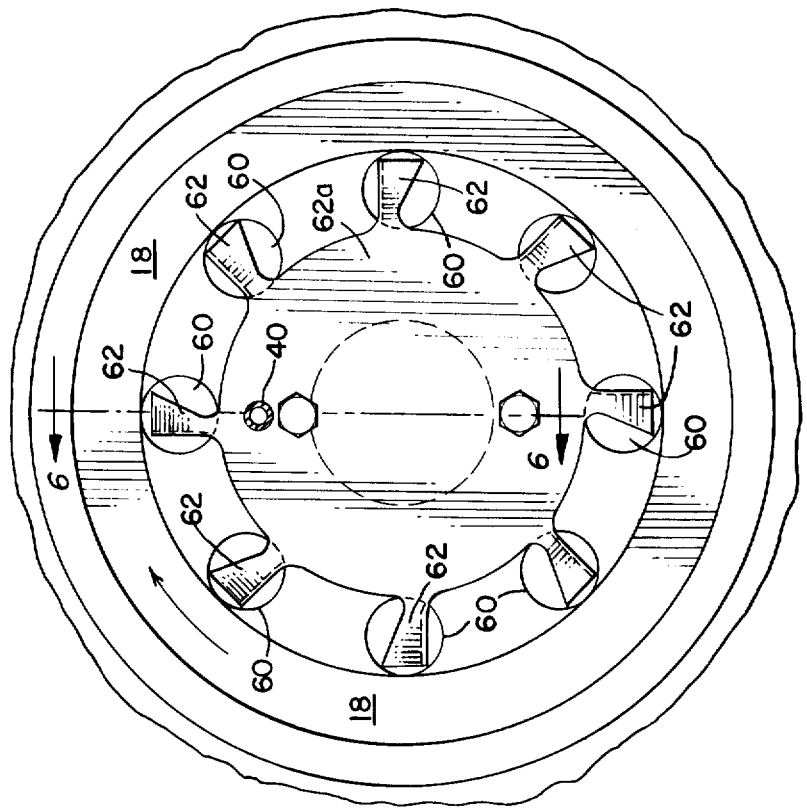
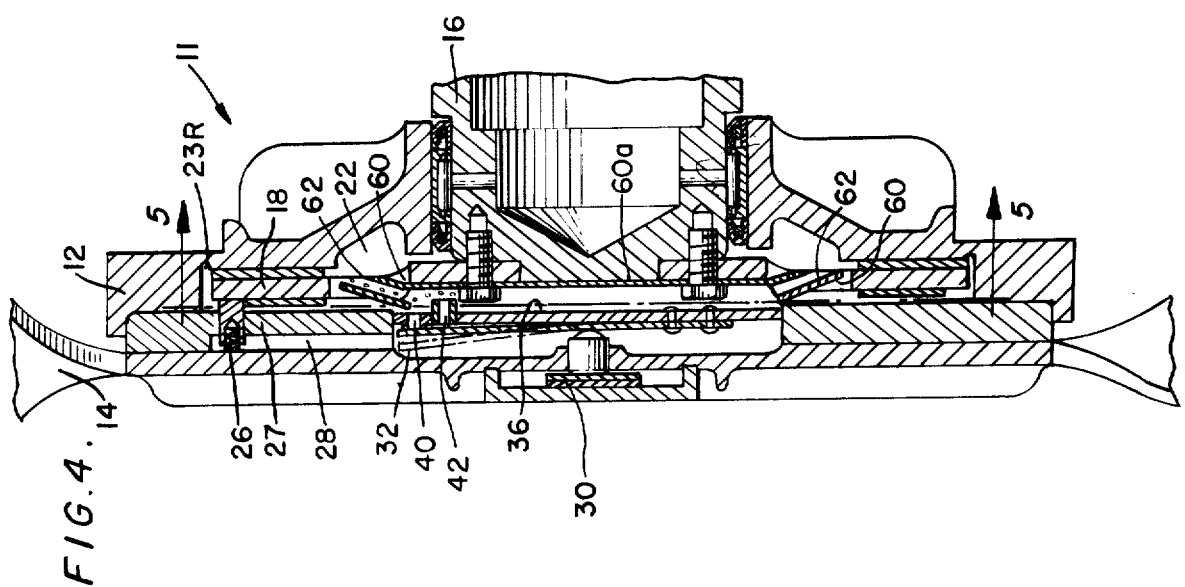

FAN DRIVE FLUID CIRCULATION APPARATUS

This invention relates to a viscous liquid fan drive for the radiator cooling system of an internal combustion engine. Such fan drives are well known and usually include a rotary drive disc which is driven by the engine. The drive disc is rotatably mounted within a housing or casing, with the casing carrying the blades of a fan. A quantity of viscous liquid, often termed a shear liquid, is admitted from a reservoir chamber to a drive chamber, the rotary disc being positioned in the drive chamber. Depending upon the amount of the shear liquid in the driving chamber the degree of rotary coupling between the driving rotor and the fan is varied. This variance is usually controlled by a temperature responsive valve assembly, the valve opening to admit a larger quantity of fluid when high cooling requirements are called for, and closing to limit the degree of rotary coupling when lower cooling requirements exist. Such assemblies often include a passageway for the shear liquid between the radially outermost portion of the drive chamber in which the drive rotor is positioned and the reservoir chamber. The shear liquid is deflected so as to flow from the radially outermost part of the drive chamber through the passageway and thence to the reservoir chamber. Such devices are well known, and are presently classified in Class 192, Subclass 58 of the United States Patent Office classification. Such devices are further described in Society of Automotive Engineers publication 740,596 of Aug. 12–16, 1974, by Everett G. Blair, hereby incorporated by reference. In general, such devices lower the power lost to the radiator cooling fan by correlating the fan power requirement with the engine cooling requirement at various engine speeds and ambient temperatures.

This invention is particularly directed to inhibiting overheating of the shear liquid when the fan drive assembly is in the disengaged mode, i.e., when there is a minimum amount of shear liquid in the driving chamber with a consequent of a high rotary slip (relative rotation) between the driving disc and the housing or casing which carries the fan blades. In the disengaged mode, the relatively small quantity of shear liquid in the drive chamber undergoes substantial temperature increase, due to internal generation of heat. Unless local high temperatures can be avoided, there is a high likelihood of breakdown in the shear liquid. Because there is no simple way of cooling this quantity of liquid, as by refrigeration, the solution to the problem according to this invention is to direct the limited liquid to the zone of maximum heat. The shear liquid continuously flows out from a zone between the drive and driven members, yet a corresponding quantity flows into it, thereby maintaining constant the total volume. In typical prior art constructions, the shear liquid in the disengaged mode tended to stagnate adjacent the radially outermost rear face portion of the drive disc, this being the primary location where heat is generated in this mode.

According to the practice of this invention, the above-mentioned redirection of the shear liquid in the disengaged mode is accomplished by guiding it from the shear liquid reservoir chamber to the rear face of the drive disc. From the rear fact it flows, under the action of centrifugal force, to the radially outermost portion of the rear face and thence axially and thence to a dam which forces it into the input end of the above-mentioned passageway connecting the radially outermost portion of the drive chamber to the fluid reservoir. In this manner, circulation of the shear liquid in the disengaged mode to this particularly troublesome region is improved and thereby breakdown of the shear liquid due to overheating inhibited. In general, this invention is carried out by the provision of a transfer tube extending from the shear liquid reservoir into the driving chamber, the transfer tube terminating at a point adjacent an element which transfers liquid through the drive disc. In one embodiment, a collector ring is carried by the front face of the drive disc to cause the limited amount of shear liquid in the disengaged mode to circulate by passing through a drive disc aperture and hence radially outward along the rear face of the disc. In another embodiment, an aperture through the rotary disc is provided with a vane which guides the shear liquid from the exit end of the transfer tube to the rear face of the drive disc.

IN THE DRAWINGS

FIG. 1 is a cross-sectional view of a liquid shear type fan drive assembly according to one embodiment.

FIG. 2 is a sectional view taken along section 2—2 of FIG. 1.

FIG. 3 is a view taken along section 3—3 of FIG. 2.

FIG. 4 is a view similar to FIG. 1, and illustrates a second embodiment of the invention.

FIG. 5 is a sectional view taken along section 5—5 of FIG. 4.

FIG. 6 is a view taken along section 6—6 of FIG. 5.

Referring now to the drawings, FIGS. 1–3, inclusive illustrate a first embodiment of the invention. The numeral 10 denotes generally the fan drive assembly of the invention and includes a housing or casing 12 having secured to it a plurality of fan blades 14. The numeral 16 denotes an input drive shaft having on its left end a drive rotor disc 18. The right-hand end of shaft 16, not illustrated, is adapted to be secured to the engine. In a typical installation, the fan 14 is placed behind the radiator of the internal combustion engine and the radiator would accordingly be to the left of the fan blades as viewed in FIG. 1.

The housing 12 includes a shear liquid reservoir chamber 20 and a shear liquid drive chamber 22, the latter receiving the rotary disc 18 which may include conventional facing material on its faces. A dam 26 such as that shown in U.S. Pat. No. 3,155,209 to Weir is positioned adjacent an aperture 27 in a portion of the casing 12, one end of the aperture 27 communicating with drive chamber 22 and the other end communicating with the radially outermost end of fluid passageway 28. The radially innermost end of passage 28 communicates with reservoir chamber 20. The numeral 30 designates generally a temperature responsive, actuating mechanism which may conventionally include a bimetallic actuating member. Actuation of the mechanism or assembly 30, in response to variations in temperature conditions within the engine, causes movement of a flapper or valve control element 32 between the indicated solid and dashed line positions. In the dashed line position, the flapper 32 is in the open position, while the illustrated solid position is termed the closed position. A partition 36 separates chamber 20 from chamber 22.

Referring now to FIG. 3 of the drawings, an enlarged section of a portion of FIG. 1 is shown. In addition to the greater detail, the solid line position of the flapper or valve member 32, which is actuated by the temperature response to the mechanism 30, is shown in the closed position, while the dashed lines indicate its open position. The partition 36 is provided with a valve seat aperture 40 and a passageway or opening 42 within a transfer tube 42a, both establishing liquid communication between the reservoir chamber 20 and the drive chamber 22. The valve seat aperture 40 is opened and closed by the valve member 32 and is located radially outwardly in relation to opening 42.

A collector ring 44 of complete annular extent is secured to the front or left-hand face 18F of drive rotor 18. The collector ring extends a short axial distance and terminates on its left portion with a radially inwardly turned flange or edge 46. The major portion of the collector ring is denoted by the numeral 48 and may be secured, as by bolts as indicated, to the left-hand face 18F of the drive rotor and the left-hand end of the input shaft 16. The elements 44, 46 and 48 thus define in general a dish-shaped member, with the bottom of the dish being secured to the left face of input shaft 16. The rotor 18 is provided with a plurality of apertures 50 which are in alignment with a plurality of corresponding apertures 51 in the collector ring. Conventional, larger apertures 52 are angularly spaced around the drive disc at radially intermediate regions.

Except for the transfer tube 42a, the collector ring 44 and apertures 50 and 51, the construction thus far described, with respect to FIGS. 1-3, inclusive, is conventional. The operation of such a known construction was as follows. Referring now to FIGS. 1, 2 and 3 particularly, when the temperature conditions of the engine dictated maximum radiator cooling requirements, the flapper valve member 32 extended to the full open position under the action of mechanism 30. A copious supply of shear liquid passed through the valve seat aperture 40 in the partition 36 and thence radially outward along the front face 18F of drive disc 18. The excess portion of this liquid would pass through the apertures 52 to the rear face 18R of drive disc 18. The grooving pattern (well known in the art) on the rear rotor faces is so constructed as to pump the liquid radially outward along face 18R, thence across the rotor outside diameter from right to left, radially inward along face 18F, through the apertures 52 to repeat the circuit. Thus there was a circulation of the shear liquid in a counterclockwise direction around the rotor as viewed in the upper part of FIG. 1 and FIG. 3. The dam element 26, which may be imagined by the reader as a kind of scoop, scooped some of the liquid at the radial outermost portions of chamber 22 to force it through aperture 27 into passageway 28. When a maximum amount of shear liquid existed in the drive chamber there was still more relative rotation between the drive disc 18 and the housing or casing 12, and this relative rotation made possible the scooping action of dam 26. The hydraulic head was sufficient to drive the liquid radially inward along passageway 28 against centrifugal force back into reservoir chamber 20 from which it again passed through the aperture 40 in the partition 36 for a repetition of this action. There was thus a second circulatory flow in a counterclockwise direction as viewed in the top of FIG. 1 and in FIG. 3. Cooling air impinged on the front of the drive, cooled it sufficiently so that the heat of the shear liquid which passed along front wall of drive chamber 22, the passageway 28 and the reservoir chamber 20 was easily dissipated.

In this prior type of operation, however, when the temperature conditions called for minimum cooling by the fan, the flapper or valve 32 would be closed or nearly closed by the action of the temperature responsive means 30. To obtain minimum fan speed, minimum liquid in the rotor chamber 22 is a prime requisite. Design limitations quite often prevent complete evacuation of fluid and therefore some residual fan speed remains thereby generating torque and internal frictional heat. A limited supply of the shear liquid was permitted to flow through an aperture (not illustrated) located in partition 36 of the site of tube 42a, to dissipate this heat. It flowed radially outward primarily along the front face 18F of the rotor to be scooped by the dam 26 into aperture 27 and passageway 20. Due to fan thrust, the rear face 18R of the rotor is in contact with the housing thus becoming the zone where heat is generated. Very little liquid flows into this area thereby causing stagnation, overheat, and quite often breakdown of shear (torque transmitting) properties of the shear liquid.

A description will now be given of the improved mode of operation, according to the construction shown at FIGS. 1-3.

During the operation of the assembly when maximum engine cooling is required, the flapper valve 32 is in the open or dotted line position of FIG. 3. Shear liquid passes through valve seat aperture 40, passes radially outwardly under the action of centrifugal force into the drive chamber 22. Because of the high volume of shear liquid, some will pass directly to the front rotor face 18F and some will pass through the apertures 52 in the rotor to the rotor rear face 18R. The collector ring 44 is not effective in the operating mode. Therefore, the sequence of operation is the same as in the prior art construction described above.

In the case now of minimal flow, i.e., the valve 32 closed or substantially closed, the utility of this invention is plainly exhibited. In this circumstance a limited amount of liquid passes through the opening 42 of transfer tube 42a, passes radially outward under the action of centrifugal force into the collector ring 44 with its flange 46, and finally passes through a plurality of apertures 50 and 51.

This limited amount of shear liquid is thus guided or compelled to traverse this path, and accordingly goes radially outwardly along the rear face 18R of drive disc 18. This increased amount of shear liquid flow along the rear face causes an increased circulation and inhibits stagnation at the annular region 23R and along rear face 18R.

Referring now to FIGS. 4-6 of the drawings, a second embodiment of the invention is illustrated. The numeral 11 denotes generally the fan drive assembly according to the second embodiment and a comparison of FIGS. 1 and 4 reveals that, except for a construction difference at the drive rotor, the construction is otherwise identical. Referring now to FIGS. 5 and 6 of the drawings, the numeral 60 denotes any one of a plurality of angularly spaced apertures radially medially of drive disc 18. A vane assembly 62a having a plurality of vanes 62 circumferentially and equally spaced along its periphery is secured to the left face of the rotor as with bolts. Each vane 62 is positioned within an aperture 60, with the radially innermost end 64 of each vane 62 occupying the approximate axial position of the right end of transfer tube 42a. The radially outermost end 66 of each of the vanes terminates adjacent the rear face 18R of the drive rotor.

The mode of operation of this second embodiment is substantially the same as that with respect to the first embodiment, except for the form of the means for guiding the shear liquid from the transfer tube 42a to the rear face 18R in the disconnect mode.

In the full-on mode, the operation is identical to that previously described, namely, the shear liquid circulates in a counterclockwise direction, passing as viewed in FIG. 6 and the top of FIG. 4, radially outwardly along rear face 18R of rotor 18. Thence from right to left and radially inwardly along the front face 18F of rotor 18, through the voids between the vanes 62 and the apertures 60, back to the rear face 18R of rotor 18 to repeat the cycle. Some of the liquid in the drive chamber is scooped by the dam 26 and compelled to pass through the aperture 27, thence radially inwardly along passageway 28 into reservoir chamber 20. Here it passes through the aperture 40 by virtue of the open position of flapper 32 into the drive chamber 22 to the front face 18F of rotor 18 and also through the aperture 60 to the rear face 18R of rotor 18. The dam 26 compels some of the fluid to enter the passageway 28 to repeat its counterclockwise cycle.

In the disconnect mode, with relatively little shear liquid passing from chamber 20 into drive chamber 22, that shear liquid which does exit from right end of transfer tube 42a is thrown by centrifugal action radially outwardly and strikes the input ends 64 of vanes 62. The vanes guide the shear liquid to the rear face 18R of rotor 18, to thereby enhance circulation at annular zone 23R and the rear face 18R (see FIG. 4) in a manner entirely analogous to that previously explained.

From the above, the reader will observe that the apertures 50–51 of FIGS. 1–3 and the aperture-vane combination 60–62 of the embodiment of FIGS. 4–6 form a part of the hydraulic pathway between the transfer tube 42a and the rear face 18R of the drive rotor. Further, while port or aperture 40 is closed or substantially closed, the transfer tube and associated apertures function to allow at least a minimum shear liquid flow to the rear 18R of the rotor. This is in distinction to the prior art where an aperture alone would not guide the minimum liquid volume to the rear face 18R when minimum fan cooling of the engine was required.

The reader will further note that the collector ring 44 and the vanes 62 form deflectors to deflect or direct the shear liquid through, respectively, openings 50 and 60. From a consideration of FIGS. 3 and 6 particularly, it is seen that these deflectors both extend axially of their associated disc apertures.

What is claimed is:

1. A viscous fluid fan drive assembly of the type adapted for use with the cooling system of an internal combustion engine, the fan drive assembly including a housing, the housing including a chamber, the chamber being divided by a partition into a driving chamber and a reservoir chamber, a rotary drive disc received within the drive chamber and secured to a shaft rotatably mounted within the housing, at least one aperture in the drive disc, a viscous shear liquid within at least one of said driving and reservoir chambers, a fluid passageway between the radially outermost portion of the driving chamber and the reservoir chamber, a fluid port in the said partition, thermally responsive means for regulating the amount of shear liquid passing through the fluid port of the partition, the improvement comprising deflector means carried by the said drive disc to direct shear liquid from said reservoir chamber through the said drive disc aperture to the rear face of said drive disc when said fluid port is at least substantially closed, said deflector means extending at least partially axially of said disc aperture.

2. A viscous fluid fan drive assembly of the type adapted for use with the cooling system of an internal combustion engine, the fan drive assembly including a housing, the housing including a chamber, a rotary drive disc received within the chamber and secured to a shaft rotatably mounted within the housing, the chamber being divided by a partition into a driving chamber and a reservoir chamber, a viscous shear liquid within at least one of said driving and reservoir chambers, a fluid passageway between the radially outermost portion of the driving chamber and the reservoir chamber, a fluid port in the said partition, thermally responsive means for regulating the amount of shear liquid passing through the fluid port in the partition, the improvement comprising, at least one aperture in said rotary drive disc, a transfer tube extending from the partition side of said reservoir chamber into said driving chamber and terminating radially inward of and also adjacent said aperture in the driving disc for at least one angular position of the drive disc relative to the housing, whereby at least a portion of the shear liquid in the reservoir chamber passing to the driving chamber will pass through the transfer tube and from the end of the transfer tube through the said aperture in the drive disc to the rear side of the drive disc.

3. The fan drive assembly of claim 2 including means carried by said drive disc for guiding shear liquid exiting from said transfer tube through said drive disc aperture.

4. The viscous fluid fan drive assembly of claim 3 wherein said means comprises a collector ring carried by the said rotary drive disc, the collector ring including an axially extending flange radially outwardly of the drive chamber end of the transfer tube, the axial extent of the flange being such that it extends axially beyond said transfer tube end, towards the partition, whereby fluid passing from the transfer tube to the driving chamber is at least partially guided by the collector ring so as to pass through the aperture in the drive rotor to the rear side of the drive disc.

5. The viscous fluid fan drive assembly of claim 3 wherein said means comprises at least one vane carried by said drive rotor disc adjacent said disc aperture, said vane tilted from the front to the rear of said drive disc, whereby fluid passing from the transfer tube to the driving chamber is at least partially guided by the vane so as to pass through the aperture in the drive rotor to the rear side of the drive disc.

* * * * *